United States Patent
Bamford et al.

(10) Patent No.: US 7,496,543 B1
(45) Date of Patent: Feb. 24, 2009

(54) PRICING ENGINE FOR ELECTRONIC COMMERCE

(75) Inventors: Raymond S. Bamford, San Diego, CA (US); Sam W. Gabriel, San Diego, CA (US)

(73) Assignee: BEA Systems, Inc., San Jose, CA (US)

( * ) Notice: Subject to any disclaimer, the term of this patent is extended or adjusted under 35 U.S.C. 154(b) by 1701 days.

(21) Appl. No.: 09/843,550

(22) Filed: Apr. 26, 2001

(51) Int. Cl.
  *G06Q 99/00* (2006.01)
(52) U.S. Cl. .............................. 705/400; 705/1; 705/26; 705/27; 705/37
(58) Field of Classification Search ................. 705/400, 705/1, 26, 27, 37, 28
  See application file for complete search history.

(56) References Cited

U.S. PATENT DOCUMENTS

| | | | | |
|---|---|---|---|---|
| 5,712,989 | A * | 1/1998 | Johnson et al. | 705/28 |
| 5,873,069 | A * | 2/1999 | Reuhl et al. | 705/20 |
| 6,292,786 | B1 * | 9/2001 | Deaton et al. | 705/14 |
| 6,332,129 | B1 * | 12/2001 | Walker et al. | 705/26 |
| 6,754,636 | B1 * | 6/2004 | Walker et al. | 705/26 |
| 2001/0018672 | A1 * | 8/2001 | Petters et al. | 705/26 |
| 2002/0019761 | A1 * | 2/2002 | Lidow | 705/10 |
| 2003/0040947 | A1 * | 2/2003 | Alie et al. | 705/7 |
| 2003/0139996 | A1 * | 7/2003 | D'Antoni et al. | 705/37 |
| 2003/0233246 | A1 * | 12/2003 | Snapp et al. | 705/1 |
| 2004/0138966 | A1 * | 7/2004 | Kopelman et al. | 705/27 |
| 2005/0010494 | A1 * | 1/2005 | Mourad et al. | 705/26 |

FOREIGN PATENT DOCUMENTS

WO   WO 02/01449 A1 *   1/2002

OTHER PUBLICATIONS

Tang-J-E et al, "A conceptual model for interactive buyer-supplier relationship in electronic commerce", International Journal of Information Management, {Int-J-Inf-Manage-UK}, Feb. 2001, vol. 21, No. 1, p. 49-68.*

Tewari-G et al, "Design and implementation of an agent-based intermediary infrastructure for electronic markets.", EC'00. Proceedings of the 2nd ACM Conference on Electronic Commerce, 2000, p. 86-94.*

* cited by examiner

*Primary Examiner*—Akiba K Robinson Boyce
(74) *Attorney, Agent, or Firm*—Womble Carlyle Sandridge & Rice, PLLC

(57) ABSTRACT

A pricing engine for electronic commerce allows the owner of an electronic market place to dynamically change the pricing available at the electronic market place based on several factors including, but not limited to, manufacturer preferences, distributor preferences, e-market place preferences, the location of a buyer, identity of a buyer, order volume, and so on. A buyer can access the e-market place through the Internet, input a request for quote, and then receive a price schedule based on the above factors.

25 Claims, 6 Drawing Sheets

PRICING ENGINE FOR ELECTRONIC COMMERCE

FIELD OF THE INVENTION

The present invention relates generally to e-commerce.

BACKGROUND

In e-commerce orders for goods can be placed with an electronic market place ("e-market place") who might sell goods through the Internet from many manufacturers. As understood by the present invention, each manufacturer might have its own title and pricing policy. Some manufacturers, for instance, might desire that the e-market place actually take interim title to the goods, while other manufacturers might desire title to pass directly from the manufacturer to the buyer. As further understood herein, a variable that flows from the manufacturer's title passing preferences is that of pricing, i.e., whether the manufacturer determines the final price, or the e-market place. Moreover, the present invention recognizes that in establishing a price for a customer, it might be desirable to vary or discount the price on the basis of a great many factors, including location of the buyer, identity of the buyer, order volume, and so on. Often, these factors are not static, so the e-market place must constantly update its pricing mechanism.

With the above discussion in mind, the present invention makes the critical observation that an e-market place which sells products from perhaps hundreds of manufacturers while taking into account various and ever-changing pricing permutations and combinations must have a convenient and reliable mechanism to determine price, preferably at the time an electronic order is placed. The present invention, in making the above observation, presents the solution disclosed herein.

SUMMARY OF THE INVENTION

A computer-implemented method for determining a price of goods made by a manufacturer in response to at least one electronic order from a buyer for the goods, includes receiving the order and then determining whether title to the goods passes directly from the manufacturer to the buyer or through an intermediate e-market place. The price of the goods is based at least partially on the determining act and is displayed to the user.

In a preferred embodiment, a first pricing regime is implemented when it is determined that little to the goods passes directly from the manufacturer to the buyer. Moreover, when it is determined that title passes through an intermediate e-market place, the method further includes determining whether to implement the first pricing regime or a second pricing regime. Preferably, the method includes a step to determine whether to discount a price. In the preferred embodiment, the discount is determined based on at least one of: volume of a current order, volume of annual orders, and projected volume of orders. The discount may also be determined based on at least one of: an advance scheduling of the order, an industry segment of the buyer, a credit rating of the buyer, and a stocking/handling charge.

In a preferred embodiment, the method also includes a step to determine whether to customize a price, and the price is customized based on at least one of: geographic region, customer information, product line information, manufacturer information.

In another aspect of the present invention, a computer includes logic for executing methods acts that include receiving an order for goods and determining whether title to the goods passes directly from a manufacturer to a buyer or through an intermediate e-market place. In this aspect, the price of the goods is based at least partially on the determining act and is displayed to the buyer.

In yet another aspect of the present invention, a computer program product includes logic means that include computer readable code means for receiving a buyer order for goods. Also, the computer program product includes computer readable code means for dynamically determining whether to implement a first price or a second price based at least partially on title information. This aspect of the present invention further includes computer readable code means for displaying a price of the goods to the buyer.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
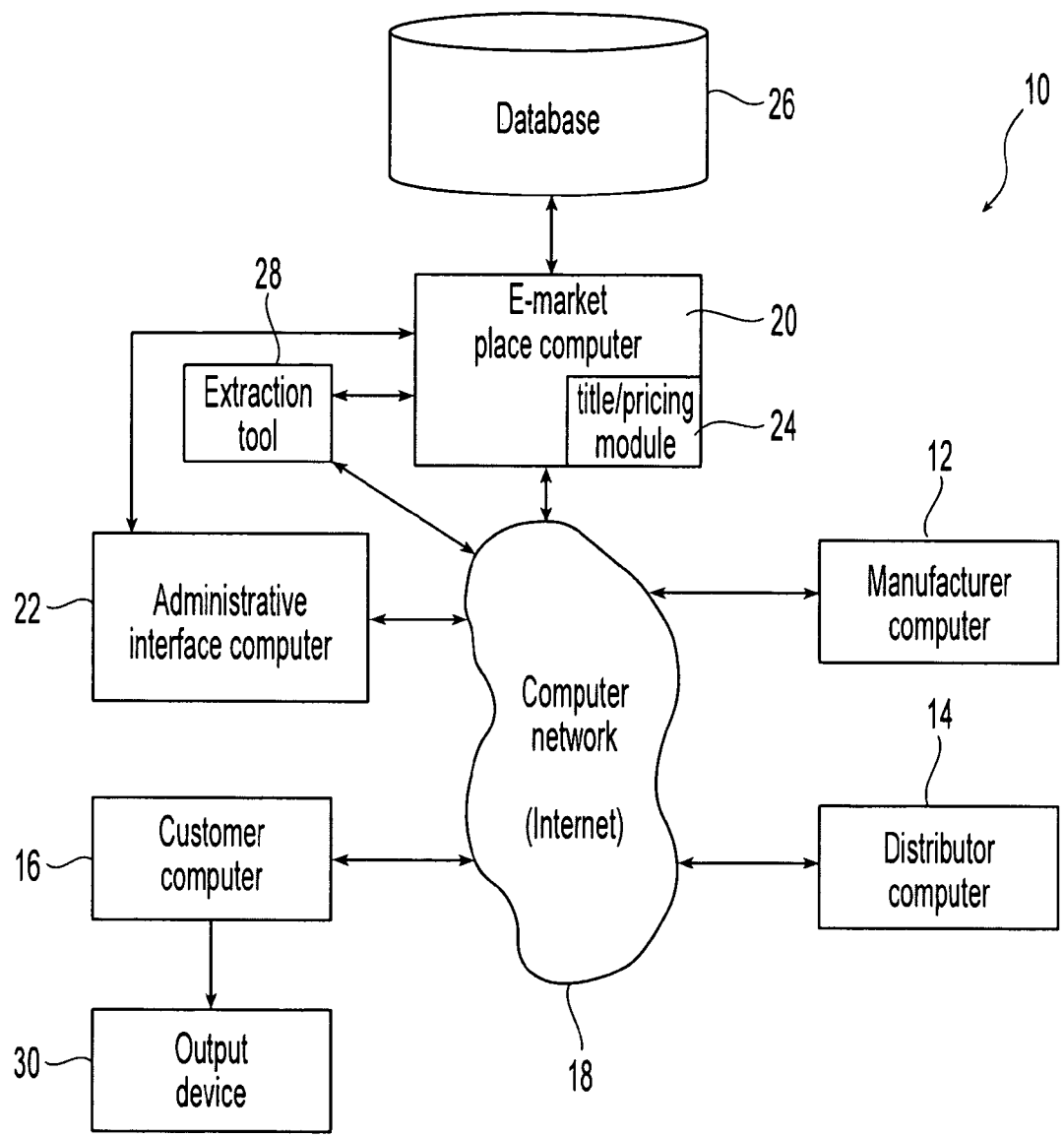
FIG. 1 is a schematic diagram of the architecture of the present invention.

Referring initially to FIG. 1, a system for e-commerce pricing is shown, generally designated 10. In the particular architecture shown, the system 10 includes a manufacturer computer 12, a distributor computer 14 and a customer computer 16, which are part of the computer network 18 referred to as the Internet. FIG. 1 shows only one manufacturer computer 12, one distributor computer 14, and one customer computer 16, but it is to be understood that many manufacturer computers 12, distributor computers 14, and customer computers 16 may be part of the below described system.

FIG. 1 also shows an e-market place computer 20 and an administrative interface computer 22 that are in communication with the manufacturer computer 12, the distributor computer 14, and customer computer 16 via the computer network 18. In one intended embodiment, the computers 12, 14, 16, 20, 22 may be Web servers or personal computers, or the computers 12, 14, 16, 20, 22 may be any computer, including computers sold under trademarks such as AS400, with accompanying IBM Network Stations. Or, the computers 12, 14, 16, 20, 22 may be Unix computers, workstations, or laptop computers, or mainframe computers, or any other suitable computing device. In the preferred embodiment, the computers 12, 14, 16, 20, 22 can communicate with each other through the network 18 via a modem, LAN, WAN, or other network device.

Referring again to FIG. 1, the e-market place computer 20 includes a local or remote title/pricing module 24 that embodies the logic disclosed herein and is used to determine the pricing schedule received by a customer seeking to purchase goods through the e-market place. As shown in FIG. 1, the e-market place computer 20 can access a database 26 of manufacturer pricing, distributor pricing, e-market place pricing, and product data. The pricing information stored in the database 26 can be received from a manufacturer or distributor directly or via the computer network 18. Moreover, an extraction tool 28, which is connected to the e-market place computer 20, can be used to contact the manufacturer computer 12 or distributor computer 14 and extract the pricing information needed by the e-market place computer 20.

As intended by the present invention, a customer can input a request for quote (RFQ) to the e-market place computer 20 via the computer network 18 and receive a price schedule according to the rules outlined below. Also, as intended by the present invention, a manufacturer or distributor can customize the title rules or pricing rules, described below, by contacting the administrative interface computer 22, via the computer network 18. IN turn, the administrative interface computer 22 transmits any changes by the manufacturer or distributor to the e-market place computer 20. If desired, the functions of the administrative interface computer 22 can be integrated into the e-market place computer 20.

The module 24 may be executed by a processor within the e-market place computer 20 as a series of computer-executable instructions. These instructions may reside, for example, in RAM of the e-market place computer 20, which, when programmed with the present logic, establishes a computer program product.

Alternatively, the instructions may be contained on a data storage device with a computer readable medium, such as a computer diskette having a data storage medium holding computer program code elements. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled C++ compatible code or Java code or more preferably extensible markup language (XML). As yet another equivalent alternative, the logic can be embedded in an application specific integrated circuit (ASIC) chip or other electronic circuitry. It is to be understood that the system 10 can include peripheral computer equipment known in the art, including output devices 30 such as a video monitor or printer and input devices such as a computer keyboard and mouse. Other output devices can be used, such as other computers, and so on. Likewise, other input devices can be used, e.g., trackballs, keypads, touch screens, and voice recognition devices.

Figure 2:
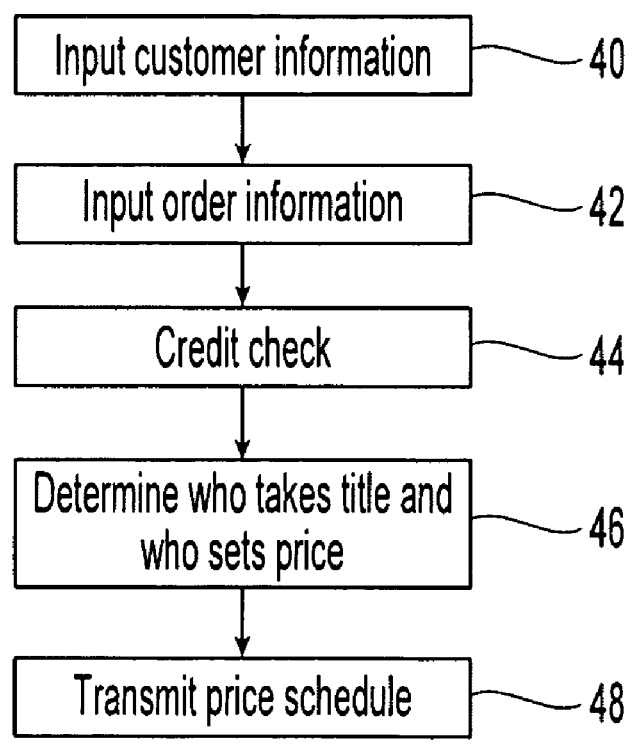
FIG. 2 is a flow chart of the overall logic.

Referring now to FIG. 2, the overall logic of the present invention can be seen. Commencing at block 40, customer information is input. Also, at block 42, order information is input, and at block 44, a credit check can be performed to determine the credit rating of the customer seeking the RFQ. Then, the logic moves to block 46 where it is determined who takes title and who sets the price of the goods that are the subject of the RFQ. The logic then continues to block 48 where a price schedule is transmitted to the customer.

Figure 3:
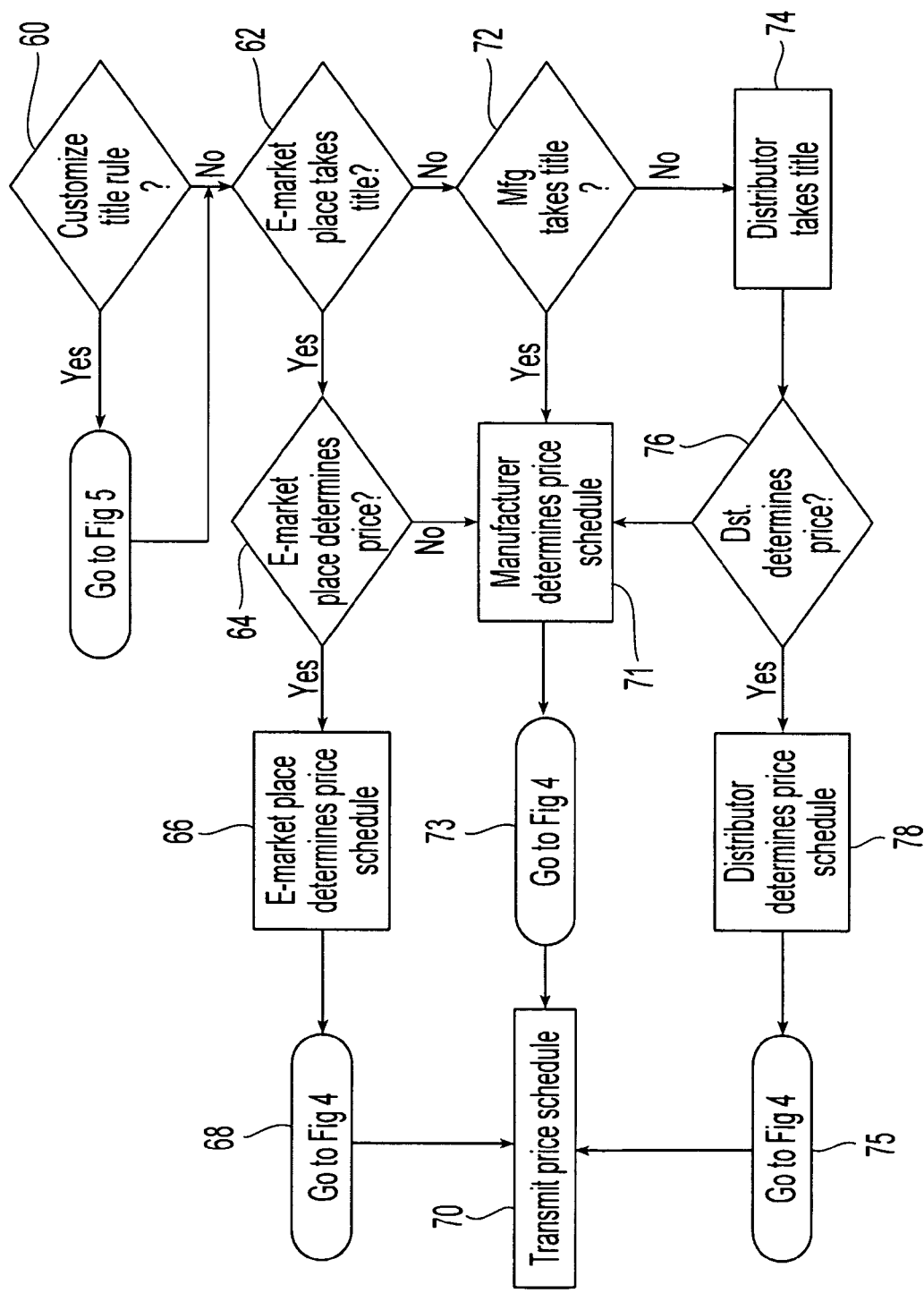
FIG. 3 is a flow chart of the overall title and pricing logic.

Referring to FIG. 3, the overall title and pricing logic is shown and commences at decision diamond 60, wherein it is determined whether to customize the title rule. If the title rule is to be customized, the logic proceeds to FIG. 5. If not, the logic moves to decision diamond 62 where it is determined whether the e-market place takes title of the goods. If the e-market place takes title of the goods, then the logic continues to decision diamond 64, where it is determined whether the e-market place determines the price of the goods. If the e-market place determines the price of the goods, the logic proceeds to block 66, wherein "e-market place determines price schedule" is returned. Thereafter, at state 68 the logic continues to FIG. 4 where, as described below, the e-market place can customize the price schedule and/or discount the prices transmitted to the customer. After any customization or discounts are applied, the logic returns to FIG. 3 and proceeds to block 70 where a price schedule is transmitted to the customer.

If, at decision diamond 64, it is determined that the e-market place does not determine the price of the goods, the logic moves to block 71, wherein "manufacturer determines price schedule" is returned. After block 71, the logic continues to FIG. 4 at state 73 and the manufacturer can customize or discount the price schedule to be transmitted at block 70.

Returning to decision diamond 62, if the e-market place does not take title to the goods, the logic proceeds to decision diamond 72 where it is determined whether the manufacturer takes title to the goods. If so, the logic continues to block 71. Otherwise, the manufacturer does not take title to the goods, and the logic moves to block 74, wherein "distributor takes title" is returned. After the distributor takes title, the logic continues to decision diamond 76 where it is determined whether the distributor determines the price schedule. If the distributor does not determine the price schedule, the logic loops to block 71 where the manufacturer determines the price schedule. In contrast, if the distributor does determine the price schedule, the logic moves to block 78, wherein "distributor determines price schedule" is returned. The logic then continues to FIG. 4 at state 75, where the distributor can customize or discount the price schedule to be transmitted at block 70.

Figure 4:
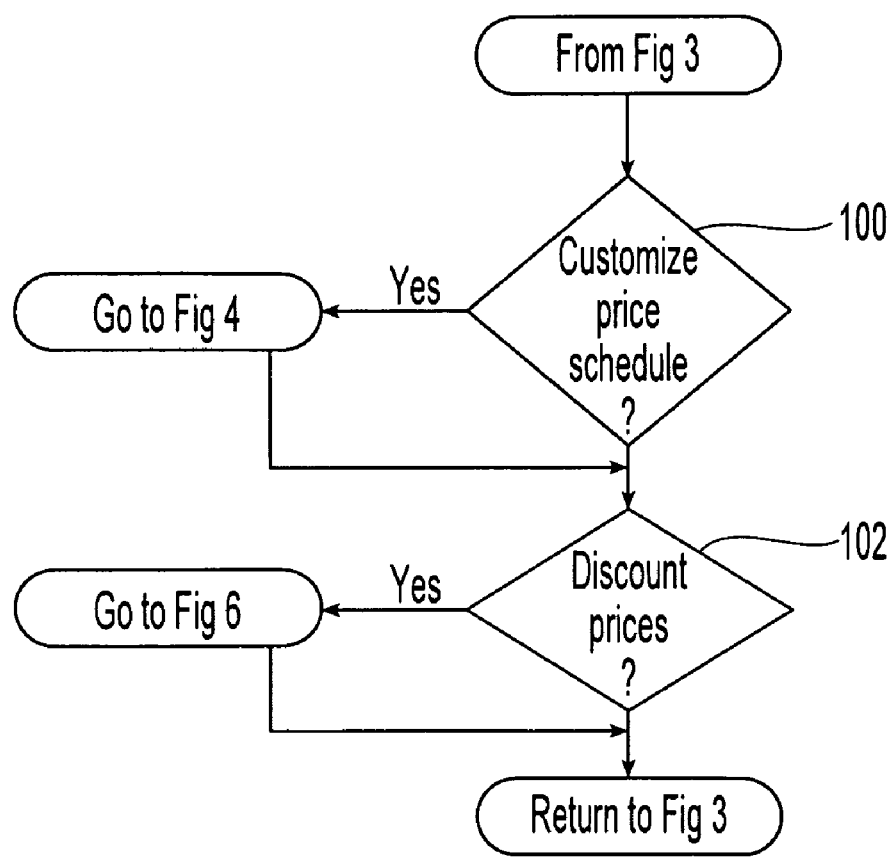
FIG. 4 is a flow chart of the general customization logic that can be applied to the title rule and/or the pricing rule.

Referring to FIG. 4, the pricing logic is shown and begins at decision diamond 100 where it is determined whether to customize the price schedule. If so, the logic proceeds to FIG. 5 and the general customization logic is followed. If the price schedule is not customized, the logic continues to decision diamond 102 where it is determined whether to discount the prices shown in the price schedule. If yes, the logic moves to FIG. 6 and the pricing discount logic is followed. After the pricing discount logic is followed, the logic returns to FIG. 3. It is to be understood, that after the general customization logic is followed, the logic returns to FIG. 4 to decision diamond 102, described above.

Figure 5:
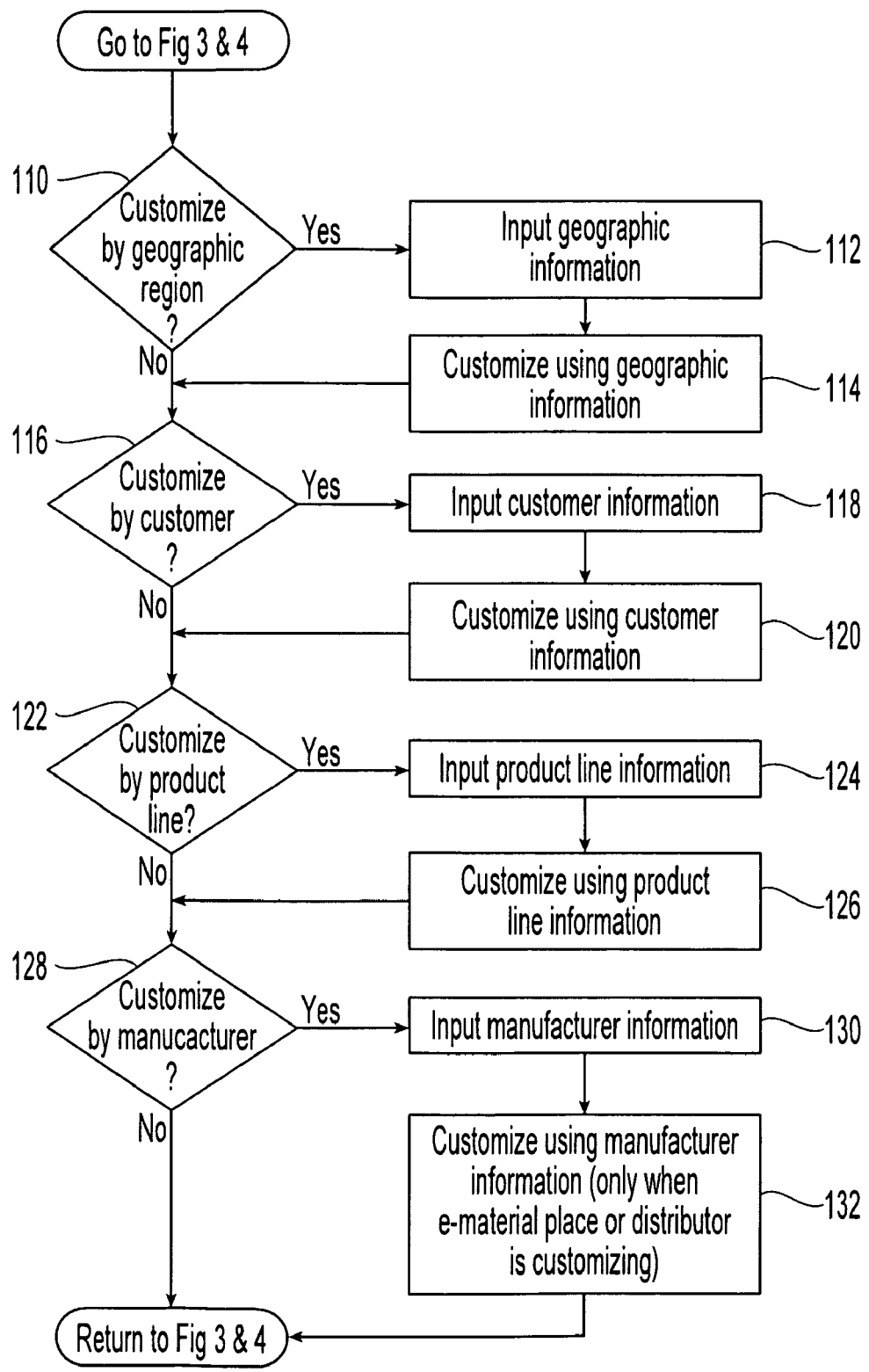
FIG. 5 is flow chart of the pricing logic followed by the e-market place, a manufacturer, or a distributor.

FIG. 5 shows the general customization logic that can be applied to either the title rule or the pricing rule. The general customization logic commences at decision diamond 110 where it is determined whether to customize by geographic region. If yes, the logic proceeds to block 112 where the geographic information is input. Thereafter, the logic moves to block 114 and either the title rule or pricing schedule is customized using the geographic information. If, at decision diamond 110, it is decided not to customize the title rule or pricing schedule using the geographic information, or following block 114, the logic continues to decision diamond 116.

At decision diamond 116, it is determined whether to customize the title rule or pricing schedule by customer information. If yes, the logic proceeds to block 118 where relevant customer information is input. After the information is input at block 118, the logic continues to block 120 where either title rule or pricing schedule is customized using the customer information. If the title rule or pricing schedule is not to be customized by customer at decision diamond 116, or following block 120, the logic continues to decision diamond 122.

At decision diamond 122, it is determined whether to customize the title rule or pricing schedule by product line. If yes, the logic proceeds to block 124 where product line information is input. After the information is input at block 124, the logic continues to block 126 where either title rule or pricing schedule is customized using the product line information. If the title rule or pricing schedule is not to be customized by product line at decision diamond 122, or following block 126, the logic continues to decision diamond 128.

At decision diamond 128, it is determined whether or not to customize the title rule or pricing schedule by manufacturer. If yes, the logic proceeds to block 130 where the manufacturer information is input. After the manufacturer information is input at block 130, the logic continues to block 132 where either title rule or pricing schedule is customized by manufacturer. If the title rule or pricing schedule is not to be customized by manufacturer at decision diamond 116, or following block 120, the logic returns to either FIG. 3 or 4. It is to be appreciated that the decision diamonds shown in FIG. 5, i.e., the customization options may be performed in any order.

Figure 6:
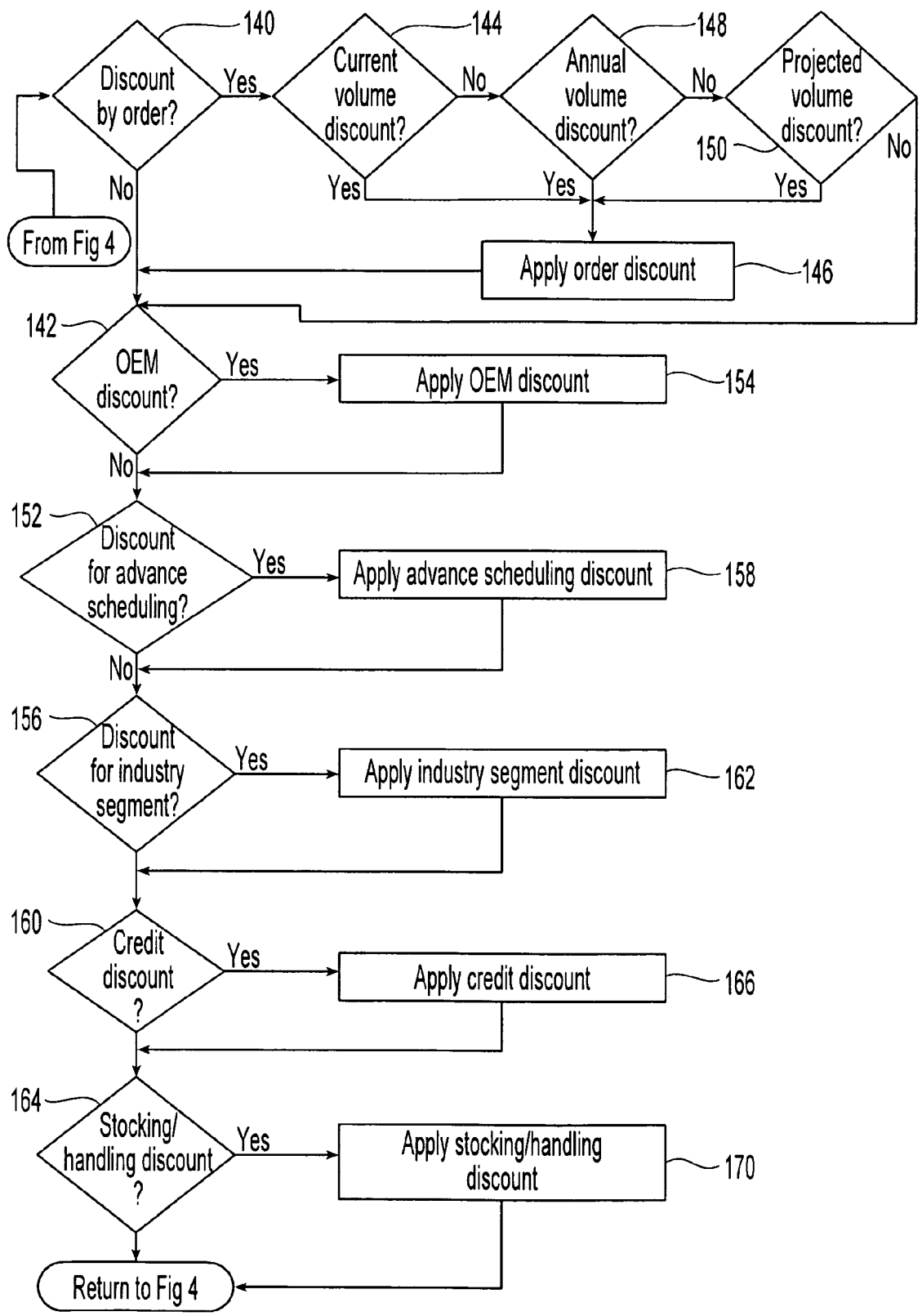
FIG. 6 is a flow chart of the pricing discount logic.

Referring now to FIG. 6 the pricing discount logic is shown and commences at decision diamond 140 where it is determined whether to discount the pricing schedule by order. If not, the logic proceeds to decision diamond 142 where it is determined whether to apply an OEM discount. If at decision diamond 140, it is determined that a discount is to be applied to a base price based on the order, the logic continues to decision diamond 144 where it is determined whether to apply a discount based on the volume of the current order. If yes, the logic moves to block 146 and a discount based on the order is applied. If no, the logic proceeds to decision diamond 148 where it is determined whether to base the order discount on the annual volume of orders by the customer seeking the RFQ. If an annual volume discount is to be applied, the logic moves to block 146 and an order discount is applied. If an annual volume discount is not applied, the logic continues to decision diamond 150 where it is determined whether to apply a projected volume discount. If yes, the logic moves to block 146 and an order discount is applied. If not, the logic proceeds to decision diamond 142. While the above logic is shown in sequential form flow, it is to be understood that equivalent state-logic is contemplated here under.

If at decision diamond 142 it is determined that an OEM discount is to be applied to a base price, the logic moves to block 154 where the OEM discount is applied. On the other hand, if an OEM discount is not to be applied, the logic continues to decision diamond 152 where it is determined whether to apply a discount for advance scheduling of the order. If, at decision diamond 152, it is determined to apply a discount for advance scheduling, the logic proceeds to block 158 where the advance scheduling discount is applied. In contrast, if it is determined not to apply a discount for advance scheduling, the logic proceeds to decision diamond 156 where it is determined whether to apply an industry segment discount. If so, the logic moves to block 162 where the industry segment discount is applied.

If at decision diamond 156, an industry discount is not to be applied the logic continues to decision diamond 160 where it is determined whether to apply a credit discount. If the test at 160 is positive, the logic proceeds to block 166 where the credit discount is applied. Also, at decision diamond 164, it is determined whether to apply a stocking/handling discount. If so, the logic moves to block 168 where the stocking/handling discount is applied. If not, the logic returns to FIG. 4. It is to be appreciated that the credit discount may be a surcharge depending on the customer's credit rating. Moreover, the stocking/handling discount may also be a surcharge. As before, while the above logic is shown in sequential form flow, it is to be understood that equivalent state-logic is contemplated here under.

With the configuration of structure described above, it is to be appreciated that the pricing engine for electronic commerce allows the owner of an electronic market place to price the goods available in the electronic market place based on manufacturers prices, distributor prices or the e-market place prices. Moreover, a manufacture may override the e-market place prices and always have the manufacturer's prices displayed to customers. As such, the present invention provides a dynamic pricing system that may be constantly updated and altered based on numerous factors, e.g., the location of the buyer, identity of the buyer, order volume, and so on.

While the particular PRICING ENGINE FOR ELECTRONIC COMMERCE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

What is claimed is:

1. A computer-implemented method for determining a price of goods made by a manufacturer in response to at least one electronic price request from a buyer for the goods, comprising the acts of:
   receiving the electronic price request from the buyer;
   in response to the electronic price request, performing a computer-executed act of determining whether title to the goods passes directly from the manufacturer to the buyer or through an intermediate e-market place;
   computing a price of the goods to the buyer based at least partially on the determining act;
   providing the buyer with a machine-readable signal for displaying the computed price.

2. The method of claim 1, where a first pricing regime is implemented when it is determined that title to the goods passes directly from the manufacturer to the buyer.

3. The method of claim 2, wherein when it is determined that title passes through an intermediate e-market place, the method further includes determining whether to implement the first pricing regime or a second pricing different than the first pricing regime.

4. The method of claim 3, further comprising the act of:
   determining whether to discount a price.

5. The method of claim 4, wherein a discount is determined based on at least one of: volume of a current order, volume of annual orders, and projected volume of orders.

6. The method of claim 4, wherein a discount is determined based on at least one of: an advance scheduling of an order, an industry segment of the buyer, a credit rating of the buyer, and a stocking/handling charge.

7. The method of claim 3, further comprising the act of: determining whether to customize a price.

8. The method of claim 7, wherein the price is customized based on at least one of: geographic region, customer information, product line information, manufacturer information.

9. A computer having logic executable by the computer to perform method acts for determining a price of goods made by a a manufacturer in response to at least one electronic price request from a buyer for the goods, said method acts comprising:
   receiving the electronic request from the buyer;
   in response to the electronic request, determining using the computer whether title to the goods passes directly from a manufacturer to a buyer or through an intermediate e-market place;
   computing a price of the goods to the buyer based at least partially on the determining act;
   providing the buyer with a machine-readable signal for displaying the computed price.

10. The computer of claim 9, further including logic for executing a method act comprising:
    implementing a first pricing regime when it is determined that title to the goods passes directly from the manufacturer to the buyer.

11. The computer of claim 10, further including logic for executing a method act comprising:
    when it is determined that title passes through an intermediate e-market place, determining whether to implement the first pricing regime or a second pricing regime.

12. The computer of claim 11, further including logic for executing a method act comprising:
    determining whether to discount a price.

13. The computer of claim 12, wherein a discount is based on at least one of: volume of a current order, volume of annual orders, and projected volume of orders.

14. The computer of claim 12, wherein a discount is based on at least one of: an advance scheduling of an order, an industry segment of the buyer, a credit rating of the buyer, and a stocking/handling charge.

15. The computer of claim 11, further including logic for executing a method act comprising:
    determining whether to customize a price.

16. The computer of claim 15, wherein the price is customized based on at least one of: geographic region, customer information, product line information, manufacturer information.

17. A computer program product embodied on a computer readable medium, having logic means executable by a computer to determine a price of goods made by a manufacturer in response to at least one electronic price request from a buyer for the goods, comprising:
    computer readable code means for receiving the electronic price request from the buyer;
    computer readable code means responsive to receiving the electronic price request for determining whether title to the goods passes directly from the manufacturer to the buyer or through an intermediate e-market place;
    computer readable code means for computing a price of the goods to the buyer based at least partially on the determining;
    computer readable code means for providing the buyer with a machine-readable signal for displaying the computed price.

18. The computer program product of claim 17, further including:
    computer readable code means for implementing a first pricing regime when it is determined that title to the goods passes directly from a manufacturer to a buyer.

19. The computer program product of claim 18, further including:
    computer readable code means for determining whether to implement the first pricing regime or a second pricing regime when it is determined that title passes through an intermediate e-marketplace.

20. The computer program product of claim 19, further including:
    computer readable code means for determining whether to discount a price.

21. The computer program product of claim 20, wherein a discount is based on at least one of: volume of a current order, volume of annual orders, and projected volume of orders.

22. The computer program product of claim 21, wherein a discount is based on at least one of: an advance scheduling of order, an industry segment of the buyer, a credit rating of the buyer, and a stocking/handling charge.

23. The computer program product of claim 19, further including:
    computer readable code means for determining whether to customize a price.

24. The computer program product of claim 23, wherein the price is customized based on at least one of: geographic region, customer information, product line information, manufacturer information.

25. At least one digital data processing machine programmed to cooperatively perform operations for determining a price of goods made by a manufacturer in response to at least one electronic request for quote (RFQ) from a prospective buyer of the goods, the operations comprising:
    receiving from the buyer an electronic message comprising an RFQ;
    responsive to receiving the RFQ, determining using the computer a price of the goods based at least partially upon a manufacturer's specification as to whether title to the goods will pass directly from the manufacturer to the buyer or through an intermediate;
    transmitting an electronic message representing the determined price to the buyer.

* * * * *

UNITED STATES PATENT AND TRADEMARK OFFICE
CERTIFICATE OF CORRECTION

PATENT NO. : 7,496,543 B1  
APPLICATION NO. : 09/843550  
DATED : February 24, 2009  
INVENTOR(S) : Bamford et al.

It is certified that error appears in the above-identified patent and that said Letters Patent is hereby corrected as shown below:

On sheet 5 of 6, in Fig. 6, ref. numeral 128, line 2, delete "manucacturer" and insert -- manufacturer --, therefor.

In column 1, line 48, delete "little" and insert -- title --, therefor.

In column 3, line 14, delete "IN" and insert -- In --, therefor.

In column 5, line 19, delete "If" and insert -- If, --, therefor.

In column 6, line 54, in claim 2, delete "where" and insert -- wherein --, therefor.

In column 7, line 12, in claim 9, after "by a" delete "a".

Signed and Sealed this

Eighteenth Day of May, 2010

David J. Kappos
*Director of the United States Patent and Trademark Office*